United States Patent
Ljung et al.

(10) Patent No.: US 11,665,570 B2
(45) Date of Patent: May 30, 2023

(54) METHOD AND SYSTEM FOR TRIGGERING AN UPLINK REFERENCE SIGNAL TRANSMISSION

(71) Applicant: Sony Corporation, Tokyo (JP)

(72) Inventors: Rickard Ljung, Lund (SE); Anders Berggren, Lund (SE)

(73) Assignee: Sony Group Corporation, Tokyo (JP)

( * ) Notice: Subject to any disclaimer, the term of this patent is extended or adjusted under 35 U.S.C. 154(b) by 242 days.

(21) Appl. No.: 17/253,694

(22) PCT Filed: Jun. 26, 2019

(86) PCT No.: PCT/US2019/039173
§ 371 (c)(1),
(2) Date: Dec. 18, 2020

(87) PCT Pub. No.: WO2020/006039
PCT Pub. Date: Jan. 2, 2020

(65) Prior Publication Data
US 2021/0314802 A1    Oct. 7, 2021

(30) Foreign Application Priority Data

Jun. 29, 2018 (SE) .................................. 1830208-3

(51) Int. Cl.
*H04W 4/00* (2018.01)
*H04W 24/10* (2009.01)
(Continued)

(52) U.S. Cl.
CPC .......... *H04W 24/10* (2013.01); *H04L 5/0051* (2013.01); *H04W 24/08* (2013.01); *H04W 36/32* (2013.01); *H04W 74/0816* (2013.01)

(58) Field of Classification Search
CPC ..... H04W 24/10; H04W 24/08; H04W 36/32; H04W 74/0816; H04W 36/0085; H04W 16/14; H04L 5/0051
(Continued)

(56) References Cited

U.S. PATENT DOCUMENTS 8,023,955 B2 * 9/2011 Anderson ............. H04W 72/14
370/320
8,107,961 B1 * 1/2012 Vargantwar ....... H04W 36/0085
455/452.2
(Continued)

FOREIGN PATENT DOCUMENTS

WO     2018102650 A1    6/2018

OTHER PUBLICATIONS

International Search Report and Written Opinion from corresponding International Application No. PCT/US2019/0391763 dated Oct. 2, 2019, 18 pages.
(Continued)

*Primary Examiner* — Amancio Gonzalez
(74) *Attorney, Agent, or Firm* — Tucker Ellis LLP (57) ABSTRACT

An electronic device (14) detects when a downlink reference signal has not been received from a base station (12), and initiates transmission of an uplink reference signal (64) in response to determining that certain trigger criteria have been satisfied. Upon receiving the uplink reference signal (64) or a notification signal (60) from the electronic device (14), the base station (12) can perform various actions to maintain network mobility and handover performance. In this manner, the disclosed approach allows a network to maintain mobility and handover performance even when a base station (12) is unable to transmit downlink reference signals due to an occupied communication channel.

20 Claims, 5 Drawing Sheets

(51) Int. Cl.
*H04L 5/00* (2006.01)
*H04W 24/08* (2009.01)
*H04W 36/32* (2009.01)
*H04W 74/08* (2009.01)

(58) Field of Classification Search
USPC .......................................................... 370/331
See application file for complete search history.

(56) References Cited

U.S. PATENT DOCUMENTS

| | | | | |
|---|---|---|---|---|
| 8,537,803 | B2* | 9/2013 | Sun | H04W 88/06 |
| | | | | 370/350 |
| 8,676,204 | B2* | 3/2014 | Uemura | H04W 48/14 |
| | | | | 455/437 |
| 9,113,340 | B2* | 8/2015 | Sun | H04L 5/22 |
| 9,277,430 | B2* | 3/2016 | Gopal | H04W 36/0088 |
| 9,521,688 | B2* | 12/2016 | Zhang | H04L 5/0053 |
| 9,913,262 | B2* | 3/2018 | Takeda | H04W 72/042 |
| 10,601,492 | B2* | 3/2020 | Xia | H04B 7/061 |
| 10,674,389 | B2* | 6/2020 | Chendamarai Kannan | H04B 7/0632 |
| 10,750,569 | B2* | 8/2020 | Nagaraja | H04W 52/0216 |
| 10,880,761 | B2* | 12/2020 | Nagaraja | H04B 7/088 |
| 10,945,288 | B2* | 3/2021 | Chendamarai Kannan | H04W 74/004 |
| 11,115,962 | B2* | 9/2021 | Kang | H04L 5/0094 |
| 11,171,708 | B2* | 11/2021 | Xia | H04B 7/061 |
| 11,363,663 | B2* | 6/2022 | Nagaraja | H04B 7/088 |
| 11,470,619 | B2* | 10/2022 | Lee | H04W 72/0406 |
| 2012/0281582 | A1* | 11/2012 | Yang | H04W 72/542 |
| | | | | 370/252 |
| 2015/0296487 | A1* | 10/2015 | Takeda | H04L 5/0048 |
| | | | | 370/329 |
| 2016/0192376 | A1* | 6/2016 | Lee | H04W 24/08 |
| | | | | 370/252 |
| 2018/0191422 | A1* | 7/2018 | Xia | H04B 7/0695 |
| 2018/0269962 | A1* | 9/2018 | Liu | H01Q 1/246 |
| 2018/0278467 | A1* | 9/2018 | John Wilson | H04W 72/0413 |
| 2019/0313264 | A1* | 10/2019 | Lin | H04W 76/11 |
| 2020/0374728 | A1* | 11/2020 | Manolakos | H04W 72/1284 |
| 2022/0131664 | A1* | 4/2022 | Nam | H04L 5/0032 |
| 2022/0225188 | A1* | 7/2022 | Pezeshki | H04W 36/00835 |

OTHER PUBLICATIONS

Qualcomm Incorporated, "RRM Requirements for LAA", 3rd Generation Partnership Project (3GPP), Jun. 2016, Hong Kong, China, Meeting #79-AH, [retrieved online] <http://www.3gpp.org/ftp/tsg_ran/WG4_Radio/TSGR4_AHs/TSGR4_79AH/Docs/>.

Qualcomm Incorporated, "Further considerations on RRM for LAA", 3rd Generation Partnership Project (3GPP), Oct. 2015, Malmo, Sweden, Meeting #91bis, [retrieved online] <http://www.3gpp.org/ftp/Meetings_3GPP_SYNC/RAN2/Docs/>.

* cited by examiner

METHOD AND SYSTEM FOR TRIGGERING AN UPLINK REFERENCE SIGNAL TRANSMISSION

RELATED APPLICATION DATA

This applications claims the benefit of Swedish Patent Application No. 1830208-3, filed Jun. 29, 2018, the disclosure of which is incorporated herein by reference in its entirety.

TECHNICAL FIELD OF THE INVENTION

The technology of the present disclosure relates generally to wireless communications among electronic devices in a network environment and, more particularly, to a method and system for triggering an uplink reference signal transmission from an electronic device in a network environment.

BACKGROUND

Demand for data traffic on wireless communication systems continues to increase. Since widespread commercialization of fourth generation (4G) wireless systems, such as a Long Term Evolution (LTE) system or an LTE-Advanced (LTE-A) system standardized by the 3rd Generation Partnership Project (3GPP), additional wireless systems are being developed. To meet demand for higher data rates and to target other use cases and deployment scenarios, wireless systems anticipate using unlicensed spectrum bands. For example, there are several projects exploring LTE-based systems that leverage unlicensed radio spectrum.

Other variants standardized by the 3GPP are Licensed Assisted Access (LAA) and Dual Connectivity (DC) with unlicensed spectrum usage. For instance, LAA utilizes unlicensed spectrum, but also utilizes licensed spectrum for some communications. An example of LAA and DC scenarios are included in the ongoing work in 3GPP to standardize New Radio Unlicensed (NR-U). In certain networks which at least partly uses unlicensed spectrum allocations, there are specific regulatory requirements to consider for the use of the unlicensed frequency band. In the unlicensed bands considered by 3GPP to be used for NR (e.g. the 5 GHz unlicensed spectrum), a channel access mechanism referred to as Listen Before Talk (LBT) often needs to be applied, where the sending side senses the channel before starting to transmit.

This LBT procedure also applies for a base station transmitting control signals such as reference signals to receiving devices. In some cases, the base station may sense the channel to be busy when it intends to transmit such control signals. In such cases, there is no reference signal to measure on for the receiving device during a handover operation. Therefore, failure to transmit reference signals from base stations may lead to unwanted degraded mobility performance.

SUMMARY

The disclosed approach provides for the ability of an electronic device to detect when a downlink reference signal has not been received, and to initiate transmission of an uplink reference signal in response. Upon receiving the uplink reference signal and/or a notification signal from the electronic device, the base station can perform various actions to maintain network mobility and handover performance. In this manner, the disclosed approach allows a network to maintain mobility and handover performance even when a base station is unable to transmit downlink reference signals due to an occupied communication channel.

According to one aspect of the disclosure, a method of maintaining mobility performance in a network from an electronic device includes monitoring for a receipt of a downlink reference signal transmitted from a first base station; detecting that the downlink reference signal has not been received; determining, in response to detecting that the downlink reference signal has not been received, that trigger criteria for transmission of an uplink reference signal has been satisfied; and transmitting a notification to the first base station or a second base station in response to determining that the trigger criteria has been satisfied, wherein the notification indicates at least one of that the downlink reference signal has not been received or that the trigger criteria has been satisfied.

According to one embodiment of the method, the method further includes initiating, in response to determining that the trigger criteria has been satisfied, transmission of an uplink reference signal.

According to one embodiment of the method, the trigger criteria pertains to the downlink based measurements.

According to one embodiment of the method, determining that the trigger criteria has been satisfied includes determining that the downlink reference signal has not been received during a measurement gap.

According to one embodiment of the method, determining that the trigger criteria has been satisfied includes determining that a detection rate of the downlink reference signal is less than a threshold detection rate.

According to one embodiment of the method, determining that the trigger criteria has been satisfied includes determining that the downlink reference signal has not been received within a threshold time of a previous downlink reference signal.

According to one embodiment of the method, determining that the trigger criteria has been satisfied includes determining that the downlink reference signal has not been received within a threshold number of measurement gaps.

According to one embodiment of the method, the method further includes determining that radio measurement criteria has been satisfied. The radio measurement criteria corresponds to at least one of the electronic device's mobility level, previously received signal strength, signal quality levels for a presently serving cell, or signal quality levels for neighboring cells.

According to one embodiment of the method, initiating transmission of the uplink reference signal is in further response to determining that the radio measurement criteria has been satisfied.

According to one embodiment of the method, the notification informs the first base station or the second base station of reduced measurement capability due to no measurement report or incomplete measurement report.

According to one embodiment of the method, the notification includes a request to initiate transmission of an uplink reference signal.

According to one embodiment of the method, the notification informs the first base station or the second base station that the electronic device has initiated transmission of the uplink reference signal or will be initiating transmission of the uplink reference signal.

According to one embodiment of the method, the first base station is a neighboring base station and the second base station is a serving base station.

According to one embodiment of the method, the first base station is a serving base station.

According to another aspect of the disclosure, a method of monitoring communication link quality at a base station included in a network includes determining that a communication channel between the base station and an electronic device on the network is occupied and that a downlink reference signal should not be transmitted; receiving at least one of a notification or an uplink reference signal from the electronic device; and performing one or more actions in response to receiving the at least one of the notification or the uplink reference signal from the electronic device.

According to one embodiment of the method, the notification indicates reduced measurement capability due to no measurement report or incomplete measurement report.

According to one embodiment of the method, the notification includes a request from the electronic device to initiate transmission of an uplink reference signal.

According to one embodiment of the method, the one or more actions includes providing permission to the electronic device to initiate transmission of the uplink reference signal.

According to one embodiment of the method, the notification includes information that the electronic device has initiated transmission of the uplink reference signal or will be initiating transmission of the uplink reference signal.

According to one embodiment of the method, the one or more actions include monitoring for uplink reference signals.

According to one embodiment of the method, the one or more actions include informing one or more neighboring base stations to perform uplink based mobility measurements.

According to one embodiment of the method, the communication channel corresponds with a first frequency, and the one or more actions comprise re-allocating the electronic device to a second frequency.

According to one embodiment of the method, the one or more actions include prolonging a measurement gap.

According to one embodiment of the method, the method further includes determining whether to handover the electronic device (14) to a neighboring base station based on the uplink reference signal (64).

According to one embodiment of the method, the step of determining that the communication channel is occupied and that the downlink reference signal should not be transmitted, is part of a listen-before-talk (LBT) procedure for use of shared spectrum.

DETAILED DESCRIPTION OF EMBODIMENTS

Introduction

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Described below, in conjunction with the appended figures, are various embodiments of systems and methods for maintaining mobility performance in a network communication system that employs a Listen Before Talk scheme to utilize unlicensed spectrum. A base station may sense that the present communication channel is occupied and decide not to transmit a downlink reference signal to an electronic device. The electronic device, upon determining whether trigger criteria is satisfied in response to failing to receive the downlink reference signal, initiates transmission of an uplink reference signal. The base station may receive the uplink reference signal and perform one or more actions in response.

System Architecture

Figure 1:
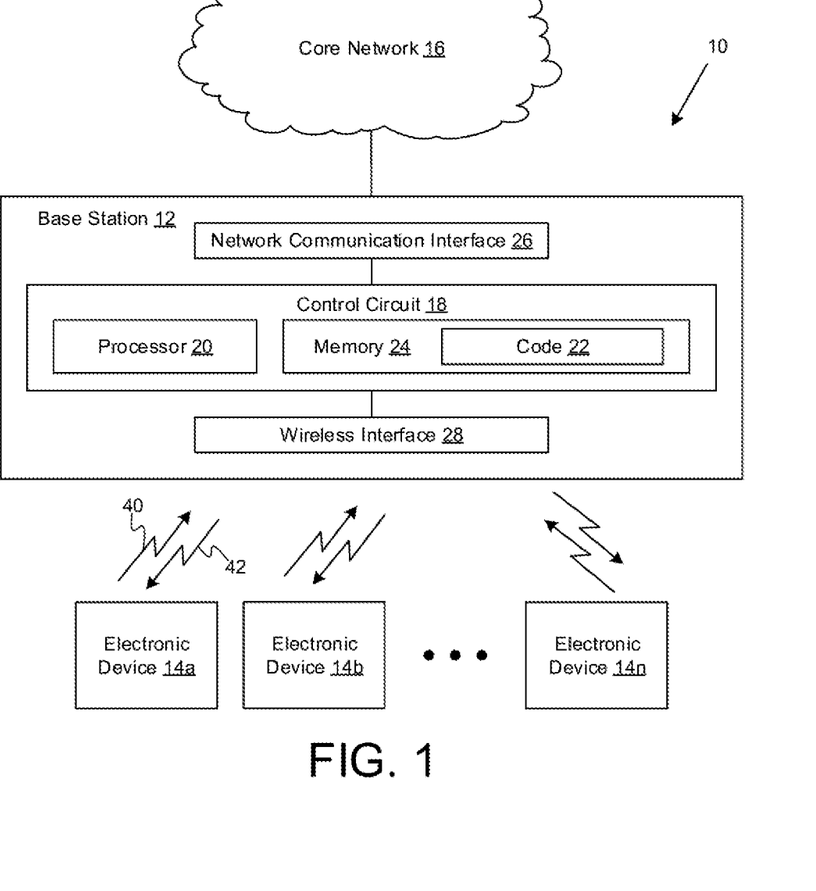
FIG. 1 is a schematic block diagram of a network communication system that operates in accordance with a listen-before-talk scheme in unlicensed radio spectrum communications.

FIG. 1 is a schematic diagram of an exemplary network communication system 10 for implementing the disclosed techniques. It will be appreciated that the illustrated communication system is representative and other systems may be used to implement the disclosed techniques. The exemplary network communication system 10 includes a base station 12 that may operate in accordance with a cellular or other wireless communication protocol, such as a protocol promulgated by 3GPP or another standard. For instance, the network communication system 10 may operate in accordance with standards that utilize unlicensed bands.

The network communication system 10 of the illustrated example supports cellular-type protocols, which may include circuit-switched network technologies and/or packet-switched network technologies. The network communication system 10 includes a base station 12 that services one or more electronic devices 14, designated as electronic devices 14a through 14n in FIG. 1. The base station 12 may support communications between the electronic devices 14 and a core network 16 through which the electronic devices 14 may communicate with other electronic devices 14, servers, devices on the Internet, etc. The electronic device 14 may establish one or more communication channels with the base station 12. For example, there may be an uplink communication channel 40 and a downlink communication channel 42. The base station 12 may be an access point, an evolved NodeB (eNB) in a 4G network or a next generation NodeB (gNB) in a 5G or NR network. As utilized herein, the term "base station" may refer, generally, to any device that services user devices and enables communications between the user devices and the network medium and, thus, includes the specific examples above depending on the network implementation.

Network communication system 10 may operate partially, or entirely, using communication channels corresponding to unlicensed frequency bands. In such a system, the base station 12 may be required to employ a Listen Before Talk (LBT) scheme to avoid data collisions with other communications that may be currently sent over the communication channel. In this manner, the base station 12 senses the present communication channel to determine whether the channel is available or occupied. If the channel is occupied, the base station does not transmit data on the present channel.

The base station 12 may include operational components for carrying out LBT operations as described herein, general wireless communications, and other functions of the base station 12. For instance, the base station 12 may include a control circuit 18 that is responsible for overall operation of the base station 12, including controlling the base station 12 to carry out the operations described in greater detail below. The control circuit 18 includes a processor 20 that executes code 22, such as an operating system and/or other applications. The functions described in this disclosure document may be embodied as part of the code 22 or as part of other dedicated logical operations of the base station 12. The logical functions and/or hardware of the base station 12 may be implemented in other manners depending on the nature and configuration of the base station 12. Therefore, the illustrated and described approaches are just examples and other approaches may be used including, but not limited to, the control circuit 18 being implemented as, or including, hardware (e.g., a microprocessor, microcontroller, central processing unit (CPU), etc.) or a combination of hardware and software (e.g., a system-on-chip (SoC), an application-specific integrated circuit (ASIC), etc.).

The code 22 and any stored data (e.g., data associated with the operation of the base station 12) may be stored on a memory 24. The code may be embodied in the form of executable logic routines (e.g., a software program) that is stored as a computer program product on a non-transitory computer readable medium (e.g., the memory 24) of the base station 12 and is executed by the processor 20. The functions described as being carried out by the base station 12 may be thought of as methods that are carried out by the base station 12.

The memory 24 may be, for example, one or more of a buffer, a flash memory, a hard drive, a removable media, a volatile memory, a non-volatile memory, a random access memory (RAM), or other suitable device. In a typical arrangement, the memory 24 includes a non-volatile memory for long term data storage and a volatile memory that functions as system memory for the control circuit 18. The memory 24 is considered a non-transitory computer readable medium.

The base station 12 includes communications circuitry that enables the base station 12 to establish various communication connections. For instance, the base station 12 may have a network communication interface 26 to communicate with the core network 16. Also, the base station 12 may have a wireless interface 28 over which wireless communications are conducted with the electronic devices 14, including the system information transmissions described herein. The wireless interface 28 may include a radio circuit having one or more radio frequency transceivers (also referred to as a modem), at least one antenna assembly, and any appropriate tuners, impedance matching circuits, and any other components needed for the various supported frequency bands and radio access technologies.

The electronic devices 14 serviced by the base station 12 may be user devices, also known as user equipment or UEs, or machine-type devices. Exemplary electronic devices 14 include, but are not limited to, mobile radiotelephones (such as "smartphones"), tablet computing devices, computers, a device that uses machine-type communications, machine-to-machine (M2M) communications or device-to-device (D2D) communication (e.g., a sensor, a machine controller, an appliance, etc.), a camera, a media player, or any other device that conducts wireless communications with the base station 12.

Figure 2:
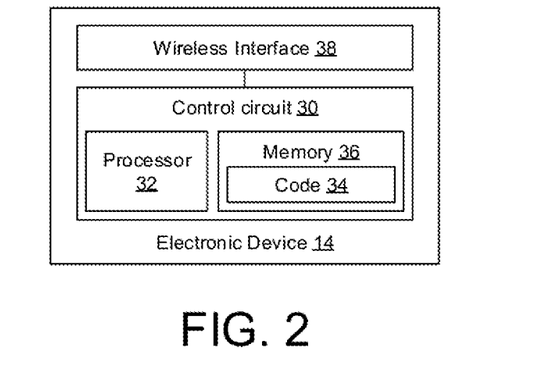
FIG. 2 is a schematic block diagram of an electronic device that forms part of the network communication system of FIG. 1.

As shown in FIG. 2, each electronic device 14 may include operational components for carrying out the wireless communications, the uplink reference signal transmission described herein and other functions of the electronic device 14. For instance, among other components, each electronic device 14 may include a control circuit 30 that is responsible for overall operation of the electronic device 14, including controlling the electronic device 14 to carry out the operations described in greater detail below. The control circuit 30 includes a processor 32 that executes code 34, such as an operating system and/or other applications. The functions described in this disclosure document may be embodied as part of the code 34 or as part of other dedicated logical operations of the electronic device 14. The logical functions and/or hardware of the electronic device 14 may be implemented in other manners depending on the nature and configuration of the electronic device 14. Therefore, the illustrated and described approaches are just examples and other approaches may be used including, but not limited to, the control circuit 30 being implemented as, or including, hardware (e.g., a microprocessor, microcontroller, central processing unit (CPU), etc.) or a combination of hardware and software (e.g., a system-on-chip (SoC), an application-specific integrated circuit (ASIC), etc.).

The code 34 and any stored data (e.g., data associated with the operation of the electronic device 14) may be stored on a memory 36. The code 34 may be embodied in the form of executable logic routines (e.g., a software program) that is stored as a computer program product on a non-transitory computer readable medium (e.g., the memory 36) of the electronic device 14 and is executed by the processor 32. The functions described as being carried out by the electronic device 14 may be thought of as methods that are carried out by the electronic device 14.

The memory 36 may be, for example, one or more of a buffer, a flash memory, a hard drive, a removable media, a volatile memory, a non-volatile memory, a random access memory (RAM), or other suitable device. In a typical arrangement, the memory 36 includes a non-volatile memory for long term data storage and a volatile memory that functions as system memory for the control circuit 30. The memory 36 is considered a non-transitory computer readable medium.

The electronic device 14 includes communications circuitry that enables the electronic device 14 to establish various communication connections. For instance, the electronic device 14 may have a wireless interface 38 over which wireless communications are conducted with the base station 12, including the system information transmission procedures described herein. The wireless interface 38 may include a radio circuit having one or more radio frequency transceivers (also referred to as a modem), at least one antenna assembly, and any appropriate tuners, impedance matching circuits, and any other components needed for the various supported frequency bands and radio access technologies.

Other components of the electronic device 14 may include, but are not limited to, user inputs (e.g., buttons, keypads, touch surfaces, etc.), a display, a microphone, a speaker, a camera, a sensor, a jack or electrical connector, a rechargeable battery and power supply unit, a SIM card, a motion sensor (e.g., accelerometer or gyro), a GPS receiver, and any other appropriate components.

Procedures for Maintaining Mobility and Handover Performance in a Listen Before Talk Scheme The network communication system 10 may utilize downlink reference signals from the base station 12 to the electronic device 14. When the electronic device 14 receives a downlink reference signal from the base station 12, the electronic device 14 can measure the downlink reference signal during a predefined period of time known as a measurement gap. The results of such measurements may be used in a base station 12 or in an electronic device 14 to determine whether the present communication channel is adequate, or if a handover should occur to a neighboring base station. In some situations, before a forthcoming handover, the electronic device 14 is commanded by the network to measure and report the signal power and/or quality of one or more target neighbor cells and reports this information to the network so that the network can make a decision whether to request the electronic device 14 to handover to the target neighbor cell. In some situations, a measurement report to the network is triggered by certain conditions of the measurement results, and is sometimes referred to as event reporting. However, when a downlink reference signal is not received by an electronic device 14, such measurement does not occur and mobility performance can become degraded due to the fact that the electronic device 14 has no measurement reference to determine measurement results or to determine whether a measurement report has been triggered or not. The systems and methods disclosed herein solve such problems by evaluating the network performance (e.g. success rate) of transmitting signals for downlink measurements and, upon concluding that the performance is worse than a performance threshold and after optionally analyzing additional potential trigger parameters, initiating an uplink based measurement. Further, electronic devices can be configured with information about the performance threshold and the optional additional trigger parameters that initiate an uplink based measurement.

An example of a situation where a downlink reference signal is not received by an electronic device 14 is when the base station 12 operates using a Listen Before Talk (LBT) scheme. In an LBT scheme, the base station 12 senses the current communication channel to determine whether the communication channel is available. If the current communication channel is available, the base station 12 can proceed to transmit data over that channel. However, if the channel is occupied, the base station 12 will not transmit the data over the channel. In situations where the base station 12 is attempting to transmit a downlink reference signal to an electronic device 14, but the current channel is occupied, the base station 12 will decide not to transmit the downlink reference signal.

Figure 3:
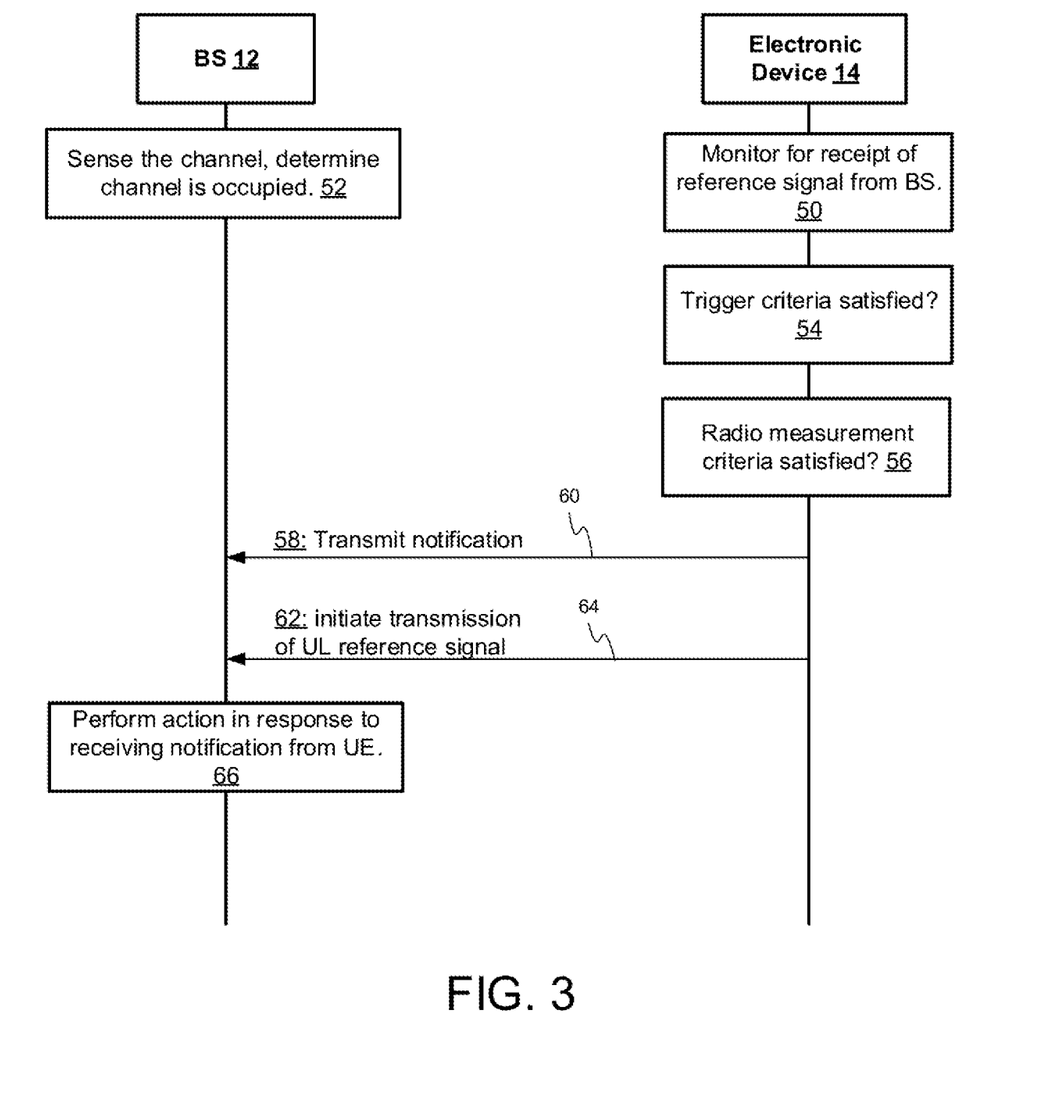
FIG. 3 is a signaling diagram of a technique to conditionally initiate transmission of an uplink reference signal.

FIG. 3 depicts a signaling diagram of a representative system. The electronic device 14 attempts to perform serving cell and neighbor cell measurements, based on measurement configurations from radio resource control (RRC) signaling. For example, in block 50, the electronic device 14 monitors for receipt of a reference signal from a base station 12 over the established communication channel. Meanwhile in block 52, the base station 12 senses the communication channel and determines that the channel is occupied, and that it should not transmit the reference signal to the electronic device 14. Upon detecting that a reference signal has not been received from the base station 12, at block 54 the electronic device analyzes various trigger parameters pertaining to the downlink based measurements to determine whether trigger criteria is satisfied (e.g. trigger parameters worse than a predetermined threshold, indicating degraded measurement performance).

The trigger criteria can include various factors and parameters pertaining to detection of a reference signal. In one example, the trigger criteria is satisfied if the electronic device 14 does not receive a reference signal during the measurement gap. In another example, the trigger criteria is satisfied if the reference signal detection rate over a period of time is below a given level. The reference signal detection rate is defined as a number of reference signals received by the electronic device 14 over a predetermined amount of time. In another example, the trigger criteria is satisfied if the reference signal has not been received within a threshold time of a previously received downlink reference signal. In yet another example, the trigger criteria is satisfied if the reference signal has not been received within a threshold number of measurement gaps since a previously received reference signal. In another example, upon detecting a missed reference signal, the electronic device 14 can start a timer. If the number of missed reference signals exceeds a threshold number of missed reference signals during a predetermined amount of time as measured by the timer, the trigger criteria is satisfied.

In certain embodiments, the electronic device 14 can also examine certain radio measurement criteria. For example, at block 56, the electronic device 14 checks radio measurement criteria such as the electronic device's mobility level, amount of movement of the electronic device 14, location of the electronic device 14, physical speed of the electronic device 14, earlier received signal strength for serving cells, earlier received signal quality for serving cells, earlier received signal strength of neighboring cells, or earlier received signal quality of neighboring cells. For example, if the most recently received signal quality of the serving cell is high, and the most recently received signal quality of a neighboring cell is low, an electronic device 14 may decide not to initiate a notification 60 or an uplink reference signal 64 even if the trigger criteria has been satisfied. In another example, if the most recently received signal quality of the serving cell is high and the mobility level of the electronic device 14 is low (e.g. the electronic device 14 is stationary), the electronic device 14 may decide not to initiate a notification 60 or an uplink reference signal 64 even if the trigger criteria has been satisfied. On the other hand, if the mobility level of the electronic device 14 is high (e.g. the electronic device 14 is moving), the electronic device 14 may decide to initiate a notification 60 or an uplink reference signal 64 because of a high likelihood that a handover is necessary. It should be appreciated that the radio measurement criteria can be analyzed simultaneously along with the triggering criteria, before the triggering criteria, or after the triggering criteria.

At reference numerals 58 and 62, if conditions based on evaluations of the trigger criteria and, optionally, the additional radio measurement criteria are satisfied, the electronic device 14 initiates transmission of an uplink reference signal 64 and/or transmits a notification 60 that the electronic device 14 was not able to perform normal measurements and has initiated uplink based reference signal transmissions or will be initiating transmission of the uplink reference signal 64. It should be appreciated that the uplink reference signal 64 and notification 60 can be transmitted in any order, or simultaneously.

The base station 12 receives the notification 60 and/or the uplink reference signal 64 and can perform one or more actions in response to receiving the notification 60 or uplink reference signal 64 as depicted in block 66. In certain embodiments, the base station 12 can begin monitoring uplink reference signals and inform neighbor base stations to perform uplink based mobility measurements. The base station 12 can also try to re allocate the electronic device 14 to another frequency to avoid the contention issue on the presently occupied communication channel. For example, when the present communication channel corresponds with a first frequency, the base station 12 can re-allocate the electronic device 14 to a second frequency in an attempt to re-establish downlink communication with the electronic device 14 on an available channel. The base station 12 can also prolong the electronic device's 14 measurement gaps to allow for longer LBT time before the electronic device 14 considers the downlink reference signals to be missing.

The communication system can perform alternative solutions or variants of the above procedures. In one embodiment, upon determining that a reference signal has not been received and determining that the trigger criteria is satisfied, the electronic device 14 does not immediately initiate transmission of the uplink reference signal 64. The expected reference signal may be any signal the UE is expected to measure on, i.e. a serving cell signal from a serving cell base station or a neighbor cell signal from a neighbor cell base station. Rather, the electronic device 14 informs the base station 12 of the conditions—e.g. no downlink reference signal received and/or trigger criteria satisfied. The notification 60 can be used to communicate such information. After receiving notification of the conditions, the base station 12 can initiate uplink based measurements. In certain embodiments, the notification 60 can include a request to initiate transmission of an uplink reference signal 64. In response to the request to initiate transmission of the uplink reference signal 64, the base station 12 can provide permission to the electronic device 14 to initiate transmission of the uplink reference signal 64.

In another embodiment, the trigger criteria is analyzed by the electronic device 14, but the electronic device 14 does not transmit any notification 60 to the base station 12. Rather, the base station 12 receives no or incomplete measurement results from the measurement configuration in the electronic device 14. For example, if electronic device 14 fails to receive a downlink reference signal from each of the expected base stations (e.g. serving cell, neighboring cells), the measurement report transmitted to the base station 12 may be an incomplete measurement report. In this example, if the measurement report is expected to include measurement information for a serving cell and two neighboring cells, but only one neighboring cell has measurement information included in the measurement report, the measurement report can be considered an incomplete measurement report. Upon detecting that the electronic device 14 measurement report has not been received, or is worse than a predetermined performance threshold, the base station 12 can perform any of its one or more actions described above with reference to block 66.

It should be appreciated that the downlink reference signal that the electronic device 14 determines to be missing is a downlink reference signal from a neighboring base station 13 from a neighboring cell. In other embodiments, the downlink reference signal that the electronic device 14 determines to be missing is a downlink reference signal from the serving base station from the serving cell.

Figure 4:
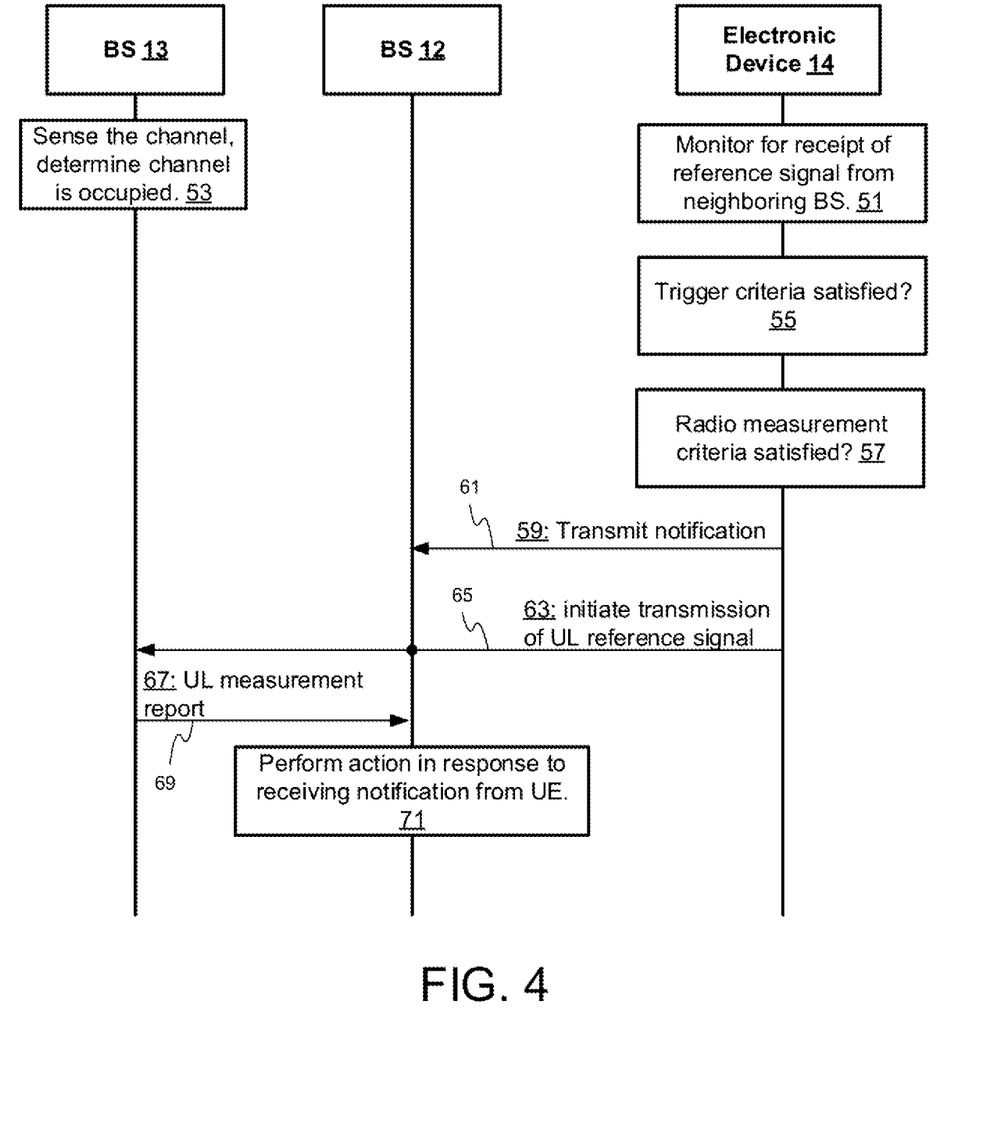
FIG. 4 is a signaling diagram of a technique to conditionally initiate transmission of an uplink reference signal.

While FIG. 3 depicts a system where the electronic device 14 is monitoring for a downlink reference signal from a serving base station 12, FIG. 4 depicts a signaling diagram of a representative system where the electronic device 14 is monitoring for a downlink reference signal from a neighboring base station 13. In block 51, the electronic device 14 monitors for receipt of a reference signal from a neighboring base station 13 over a communication channel. Meanwhile in block 53, the neighboring base station 13 senses the communication channel and determines that the channel is occupied, and that it should not transmit the reference signal to the electronic device 14. Upon detecting that a reference signal has not been received from the neighboring base station 13, at block 55 the electronic device analyzes various trigger parameters pertaining to the downlink based measurements to determine whether trigger criteria is satisfied (e.g. trigger parameters worse than a predetermined threshold, indicating degraded measurement performance).

The trigger criteria can include various factors and parameters pertaining to detection of a reference signal. In one example, the trigger criteria is satisfied if the electronic device 14 does not receive a reference signal during the measurement gap. In another example, the trigger criteria is satisfied if the reference signal detection rate over a period of time is below a given level. The reference signal detection rate is defined as a number of reference signals received by the electronic device 14 over a predetermined amount of time. In another example, the trigger criteria is satisfied if the reference signal has not been received within a threshold time of a previously received downlink reference signal. In yet another example, the trigger criteria is satisfied if the reference signal has not been received within a threshold number of measurement gaps since a previously received reference signal. In another example, upon detecting a missed reference signal, the electronic device 14 can start a timer. If the number of missed reference signals exceeds a threshold number of missed reference signals during a predetermined amount of time as measured by the timer, the trigger criteria is satisfied.

In certain embodiments, the electronic device 14 can also examine certain radio measurement criteria. For example, at block 57, the electronic device 14 checks radio measurement criteria such as the electronic device's mobility level, amount of movement of the electronic device 14, location of the electronic device 14, physical speed of the electronic device 14, earlier received signal strength for serving cells, earlier received signal quality for serving cells, earlier received signal strength of neighboring cells, or earlier received signal quality of neighboring cells. For example, if the most recently received signal quality of the serving cell is high, and the most recently received signal quality of a neighboring cell is low, an electronic device 14 may decide not to initiate a notification 61 or an uplink reference signal 65 even if the trigger criteria has been satisfied. In another example, if the most recently received signal quality of the serving cell is high and the mobility level of the electronic device 14 is low (e.g. the electronic device 14 is stationary), the electronic device 14 may decide not to initiate a notification 61 or an uplink reference signal 65 even if the trigger criteria has been satisfied. On the other hand, if the mobility level of the electronic device 14 is high (e.g. the electronic device 14 is moving), the electronic device 14 may decide to initiate a notification 61 or an uplink reference signal 65 because of a high likelihood that a handover is necessary. It should be appreciated that the radio measurement criteria can be analyzed simultaneously along with the triggering criteria, before the triggering criteria, or after the triggering criteria.

At reference numerals 59 and 63, if conditions based on evaluations of the trigger criteria and, optionally, the additional radio measurement criteria are satisfied, the electronic device 14 initiates transmission of an uplink reference signal 65 and/or transmits a notification 61 that the electronic device 14 was not able to perform normal measurements and has initiated uplink based reference signal transmissions or will be initiating transmission of the uplink reference signal 65. It should be appreciated that the uplink reference signal 65 and notification 61 can be transmitted in any order, or simultaneously. As shown in FIG. 4, the uplink reference signal 65 may be transmitted to the serving base station 12 and/or the neighboring base station 13. In one embodiment, the electronic device 14 may transmit the uplink reference signal 65 to any base stations included in a set of base stations that electronic device 14 nominally monitors for downlink reference signals such as the serving base station 12 and one or more neighboring base stations 13.

The neighboring base station may receive the uplink reference signal 65, perform measurements, and report an uplink measurement report 69 at reference numeral 67. The serving base station 12 receives the notification 61, the uplink reference signal 65, and/or the uplink measurement report 69. The serving base station 12 may perform one or more actions in response to receiving the notification 61, the uplink reference signal 65, and/or the uplink measurement report 69 as depicted in block 71. In certain embodiments, the base station 12 can begin monitoring uplink reference signals and inform neighbor base stations to perform uplink based mobility measurements. The base station 12 can also try to re allocate the electronic device 14 to another frequency to avoid the contention issue on the presently occupied communication channel. For example, when the present communication channel corresponds with a first frequency, the base station 12 can re-allocate the electronic device 14 to a second frequency in an attempt to allow the neighboring base station 13 to re-establish downlink communication with the electronic device 14 on an available channel. The base station 12 can also prolong the electronic device's 14 measurement gaps to allow for longer LBT time before the electronic device 14 considers the downlink reference signals from the neighboring base station 13 to be missing.

The communication system can perform alternative solutions or variants of the above procedures. In one embodiment, upon determining that a reference signal has not been received from the neighboring base station 13 and determining that the trigger criteria is satisfied, the electronic device 14 does not immediately initiate transmission of the uplink reference signal 65. Rather, the electronic device 14 informs the serving base station 12 of the conditions—e.g. no downlink reference signal received and/or trigger criteria satisfied. The notification 61 can be used to communicate such information. After receiving notification of the conditions, the base station 12 can initiate uplink based measurements. In certain embodiments, the notification 61 can include a request to initiate transmission of an uplink reference signal 65. In response to the request to initiate transmission of the uplink reference signal 65, the base station 12 can provide permission to the electronic device 14 to initiate transmission of the uplink reference signal 65.

In another embodiment, the trigger criteria is analyzed by the electronic device 14, but the electronic device 14 does not transmit any notification 61 to the base station 12. Rather, the base station 12 receives no or incomplete measurement results from the measurement configuration in the electronic device 14. For example, if electronic device 14 fails to receive a downlink reference signal from the neighboring base station 13, the measurement report transmitted to the base station 12 may be an incomplete measurement report. In this example, if the measurement report is expected to include measurement information for a neighboring cell, but the neighboring cell does not have measurement information included in the measurement report, the measurement report can be considered as incomplete measurement report. Upon detecting that the electronic device 14 measurement report has not been received, or is worse than a predetermined performance threshold, the base station 12 can perform any of its one or more actions described above with reference to block 71.

In another embodiment, the signaling diagrams of FIGS. 3 and 4 may both be performed. For instance, trigger criteria may be satisfied based on conditions pertaining to downlink reference signals from the serving base station 12, neighboring base station 13, or both. In either situation, initiated uplink reference signals may be measured by the serving base station 12 and/or the neighboring base station 13 to enable subsequent processing (e.g. handover decisions).

Figure 5:
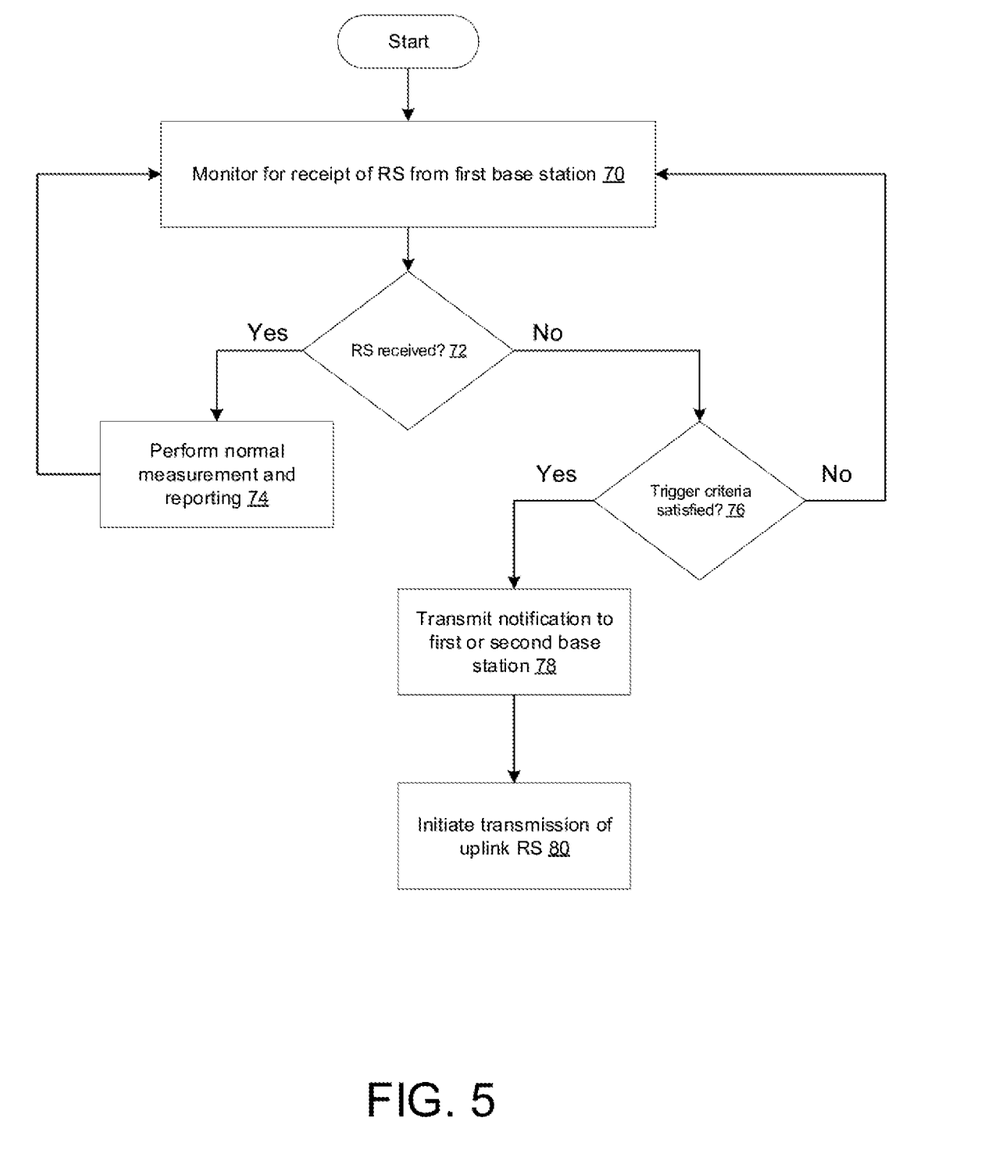
FIG. 5 is a flow-diagram of a representative method of initiating transmission of an uplink reference signal by an electronic device on the network communication system.
Figure 6:
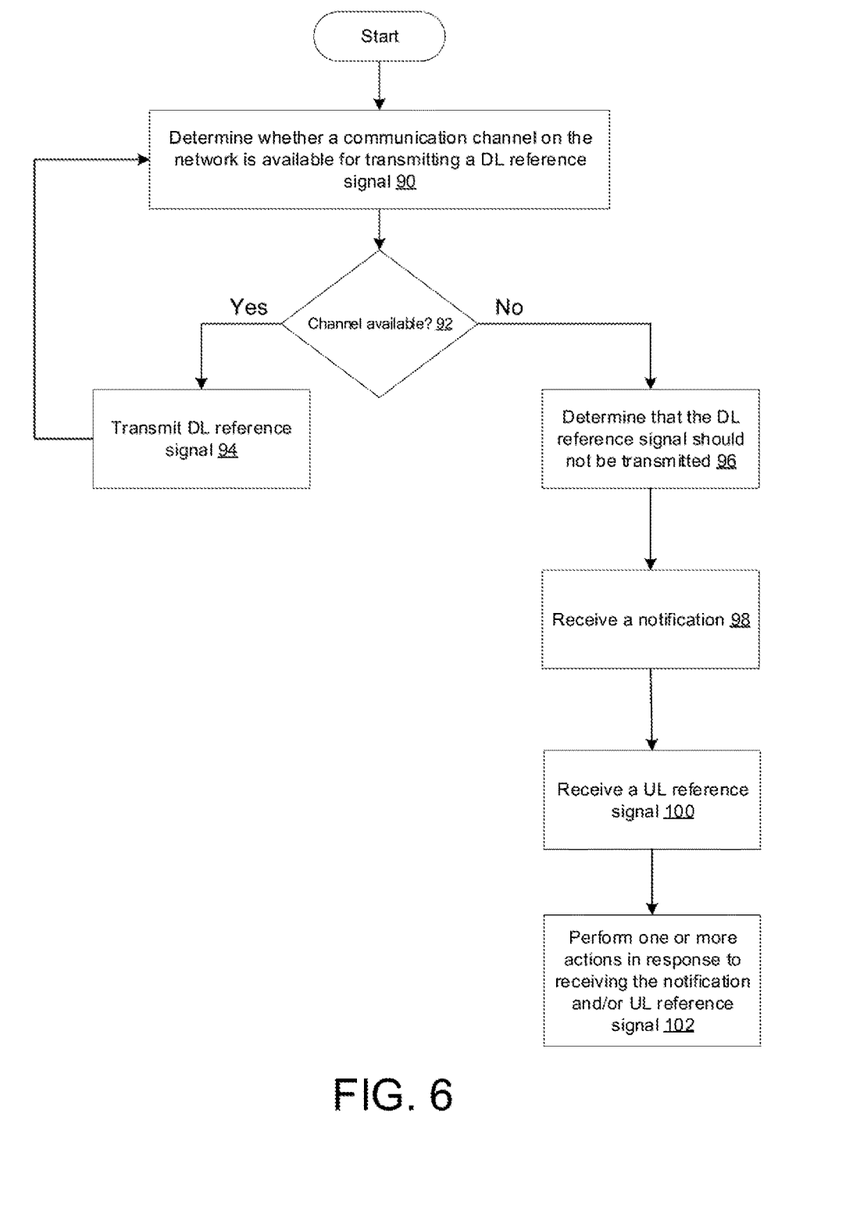
FIG. 6 is a flow-diagram of a representative method of sensing a communication channel and receiving an uplink reference signal at a base station of the network communication system.

Turning to FIG. 5, shown is an exemplary flow diagram representing steps that may be carried out by the electronic device 14 when executing logical instructions to maintain mobility performance in a network for wireless radio communications. Complimentary operations of the base station 12 are shown in FIG. 6, which shows an exemplary flow diagram representing steps that may be carried out by the base station 12 when executing logical instructions to carry out monitoring communication link quality to maintain mobility performance in a network for wireless radio communications. Although illustrated in a logical progression, the blocks of FIGS. 5 and 6 may be carried out in other orders and/or with concurrence between two or more blocks. Therefore, the illustrated flow diagrams may be altered (including omitting steps or adding steps not shown in order to enhance description of certain aspects) and/or may be implemented in an object-oriented manner or in a state-oriented manner. Also, the method represented by FIG. 5 may be carried out apart from the method of FIG. 6 and vice versa.

Referring to actions carried out by the electronic device 14, the logical flow of the method may start in block 70. The electronic device 14 monitors for receipt of a reference signal from a first base station. It should be appreciated that the first base station may be a serving base station 12 that serves the serving cell or a neighboring base station 13 that serves a neighboring cell. The electronic device 14 may monitor continuously for a reference signal, or it may monitor the reference signal during one or more measurement gaps. A measurement gap is a predefined period of time during which the electronic device 14 can perform signal quality measurements based on the base station's 12 reference signal. At block 72, the electronic device 14 determines whether or not the reference signal has been received from the first base station at an expected time, or within the measurement gap. If the electronic device 14 determines that the reference signal has been received, the electronic device proceeds to perform normal measurements and reporting in block 74.

However, if the electronic device 14 determines that the reference signal has not been received, the electronic device 14 proceeds to determine whether trigger criteria is satisfied at block 76, as described in detail above with reference to FIGS. 3 and 4. Upon determining that the trigger criteria has been satisfied, the electronic device 14 can proceed to transmit a notification 60 to the first base station or a second base station at block 78. The notification 60 can inform the first base station or the second base station that the electronic device 14 was not able to perform normal measurements and has initiated uplink based reference signal transmissions or will be initiating transmission of the uplink reference signal 64. The electronic device 14 can then initiate transmission of uplink reference signals 64 at block 80. It should be appreciated that transmitting the notification 60 and initiating transmission of the uplink reference signal 64 can occur simultaneously, or in any order. Further, in certain embodiments, a notification 60 is not transmitted. In one embodiment, the first base station is the serving base station 12 as shown in FIG. 3. In another embodiment, the first base station is a neighboring base station 13, and the second base station is the serving base station 12 as shown in FIG. 4.

Referring to actions carried out by the base station 12 as shown in FIG. 6, the logical flow of the method may start in block 90. The base station 12 may be operating as part of a network that requires use of an LBT scheme. In such a network, the base station 12 determines whether the downlink communication channel 42 is available or if it is occupied prior to transmitting a downlink reference signal. At block 92, the base station 12 determines whether or not the downlink channel 42 is available. If the channel 42 is available, the base station 12 transmits the downlink reference signal at block 94.

However, if the channel 42 is occupied, the base station 12 determines, at block 96, that the downlink reference signal should not be transmitted. At block 98, the base station 12 then receives the notification 60 from the electronic device 14. The notification 60 can inform the base station 12 that the electronic device 14 was not able to perform normal measurements and has initiated uplink based reference signal transmissions or will be initiating transmission of the uplink reference signal 64. The base station 12 then receives the uplink reference signal 64 at block 100. It should be appreciated that receiving the notification 60 and receiving the uplink reference signal 64 can occur simultaneously, or in any order. Further, in certain embodiments, a notification 60 is not received at all. After receiving the notification 60 and/or the uplink reference signal 64, the base station 12 can perform one or more actions in response to receiving the notification 60 and/or the uplink reference signal 64. The one or more actions can be any of the actions as described above in greater detail with reference to block 66 of FIG. 3 or block 71 of FIG. 4.

Conclusion

Although certain embodiments have been shown and described, it is understood that equivalents and modifications falling within the scope of the appended claims will occur to others who are skilled in the art upon the reading and understanding of this specification.

What is claimed is:

1. A method of maintaining mobility performance in a network from an electronic device, comprising:
monitoring for a receipt of a downlink reference signal transmitted from a first base station;
detecting that the downlink reference signal has not been received;
determining, in response to detecting that the downlink reference signal has not been received, that trigger criteria for transmission of an uplink reference signal has been satisfied; and
transmitting a notification to the first base station or a second base station in response to determining that the trigger criteria has been satisfied, wherein the notification indicates at least one of that the downlink reference signal has not been received or that the trigger criteria has been satisfied.

2. The method of claim 1, further comprising:
initiating, in response to determining that the trigger criteria has been satisfied, transmission of an uplink reference signal.

3. The method of claim 1, wherein the trigger criteria pertain to the downlink based measurements.

4. The method of claim 1, wherein determining that the trigger criteria has been satisfied comprises determining that the downlink reference signal has not been received during a measurement gap.

5. The method of claim 1, wherein determining that the trigger criteria has been satisfied comprises at least one of:
determining that a detection rate of the downlink reference signal is less than a threshold detection rate;
determining that the downlink reference signal has not been received within a threshold time of a previous downlink reference signal; or
determining that the downlink reference signal has not been received within a threshold number of measurement gaps.

6. The method of claim 1, further comprising:
determining that radio measurement criteria has been satisfied, wherein the radio measurement criteria corresponds to at least one of the electronic device's mobility level, previously received signal strength, signal quality levels for a presently serving cell, or signal quality levels for neighboring cells.

7. The method of claim 6, wherein initiating transmission of the uplink reference signal is in further response to determining that the radio measurement criteria has been satisfied.

8. The method of claim 1, wherein the notification at least one of:
informs the first base station or the second base station of reduced measurement capability due to no measurement report or incomplete measurement report;
informs the first base station or the second base station that the electronic device has initiated transmission of the uplink reference signal or will be initiating transmission of the uplink reference signal; or
comprises a request to initiate transmission of an uplink reference signal.

9. The method of claim 1, wherein the first base station is a neighboring base station, and the second base station is a serving base station.

10. The method of claim 1, wherein the first base station is a serving base station.

11. An electronic device comprising a wireless interface and a control circuit configured to carry out the method of claim 1.

12. A method of monitoring communication link quality at a base station included in a network, comprising:
determining that a communication channel between the base station and an electronic device on the network is occupied and that a downlink reference signal should not be transmitted;

receiving at least one of a notification or an uplink reference signal from the electronic device; and performing one or more actions in response to receiving the at least one of the notification or the uplink reference signal from the electronic device.

13. The method of claim 12, wherein the notification at least one of:

indicates reduced measurement capability due to no measurement report or incomplete measurement report;

comprises a request from the electronic device to initiate transmission of the uplink reference signal; or includes information that the electronic device has initiated transmission of the uplink reference signal or will be initiating transmission of the uplink reference signal.

14. The method of claim 12, wherein the one or more actions comprise one or more of:

providing permission to the electronic device to initiate transmission of the uplink reference signal;

monitoring for uplink reference signals; or informing one or more neighboring base stations to perform uplink based mobility measurements.

15. The method of claim 12, wherein the communication channel corresponds with a first frequency, and the one or more actions comprise re-allocating the electronic device to a second frequency.

16. The method of claim 12, wherein the one or more actions comprise prolonging a measurement gap.

17. The method of claim 12, further comprising:

determining whether to handover the electronic device to a neighboring base station based on the uplink reference signal.

18. The method of claim 12, wherein the step of determining that the communication channel is occupied and that the downlink reference signal should not be transmitted, is part of a listen-before-talk (LBT) procedure for use of shared spectrum.

19. A base station comprising a wireless interface and a control circuit configured to carry out the method of claim 12.

20. A system comprising:

an electronic device having a wireless interface and a control circuit configured to:

monitor for a receipt of a downlink reference signal transmitted from a first base station;

detect that the downlink reference signal has not been received;

determine, in response to detecting that the downlink reference signal has not been received, that trigger criteria for transmission of an uplink reference signal has been satisfied; and transmit a notification to the first base station or a second base station in response to determining that the trigger criteria has been satisfied, wherein the notification indicates at least one of that the downlink reference signal has not been received or that the trigger criteria has been satisfied; and a base station having a wireless interface and a control circuit configured to:

determine that a communication channel between the base station and an electronic device on the network is occupied and that a downlink reference signal should not be transmitted;

receive at least one of a notification or an uplink reference signal from the electronic device; and perform one or more actions in response to receiving the at least one of the notification or the uplink reference signal from the electronic device.

* * * * *